United States Patent
Haigh

[11] 3,733,079
[45] May 15, 1973

[54] SEAL ASSEMBLY
[75] Inventor: Henry A. Haigh, Howell, Mich.
[73] Assignee: Haigh Plastics Products Corporation, Howell, Mich.
[22] Filed: Mar. 5, 1971
[21] Appl. No.: 121,303

[52] U.S. Cl. .................277/184, 277/225, 277/227, 277/DIG. 6
[51] Int. Cl. .............................................F16j 15/32
[58] Field of Search...................277/182, 178, 225, 277/227, 184, 181, 183, 188, DIG. 6, 26; 308/187.1

[56] References Cited
UNITED STATES PATENTS

| | | | |
|---|---|---|---|
| 3,443,845 | 5/1969 | Walchle et al. | 277/227 X |
| 3,601,417 | 8/1971 | Szepesvary | 277/178 |
| 3,169,809 | 2/1965 | Pendleton | 277/82 X |
| 3,493,236 | 2/1970 | Kleindienst | 277/225 X |
| 2,676,823 | 4/1954 | Olson et al. | 277/227 UX |

Primary Examiner—Samuel B. Rothberg
Attorney—Whittemore, Hulbert & Belknap

[57] ABSTRACT

A seal assembly for a front wheel inner bearing comprising a flat ring of elastomeric material and an annular plastic rim or housing molded on the outer edge portion of the ring and adapted to fit within the wheel hub at the inner end thereof.

2 Claims, 3 Drawing Figures

PATENTED MAY 15 1973 3,733,079

INVENTOR.
HENRY A. HAIGH

BY
*Whittemore, Hulbert + Belknap*

ATTORNEYS

SEAL ASSEMBLY

BACKGROUND AND SUMMARY OF THE INVENTION

Seal assemblies have heretofore been made for the front wheel inner bearing having a steel rim or housing crimped about a rubber ring. Such seal assemblies have been costly to make, heavier than necessary, subject to rusting and other corrosion, and generally not entirely satisfactory for their intended purpose.

My improved seal assembly has an annular plastic housing or rim molded on the outer edge portion of the ring, preferably by injection molding, at a substantial savings in cost, weight and tooling.

One object of the present invention is to provide an improved seal assembly for a front wheel inner bearing which overcomes the objections to seal assemblies which have been used in the past.

Another object is to provide a seal assembly comprising an annular plastic housing or rim molded on the outer edge portion of the elastomeric ring.

Another object is to provide a seal assembly formed of nylon, preferably glass-fiber reinforced nylon.

Another object is to provide a seal assembly having an interference fit in the wheel hub.

Another object is to provide a seal assembly wherein the outer lateral edges of the housing are arcuately convex to facilitate the installation of the housing in the wheel hub with a press fit.

Other objects and features of the invention will become apparent as the description proceeds, especially when taken in conjunction with the accompanying drawing, wherein.

Figure 1:
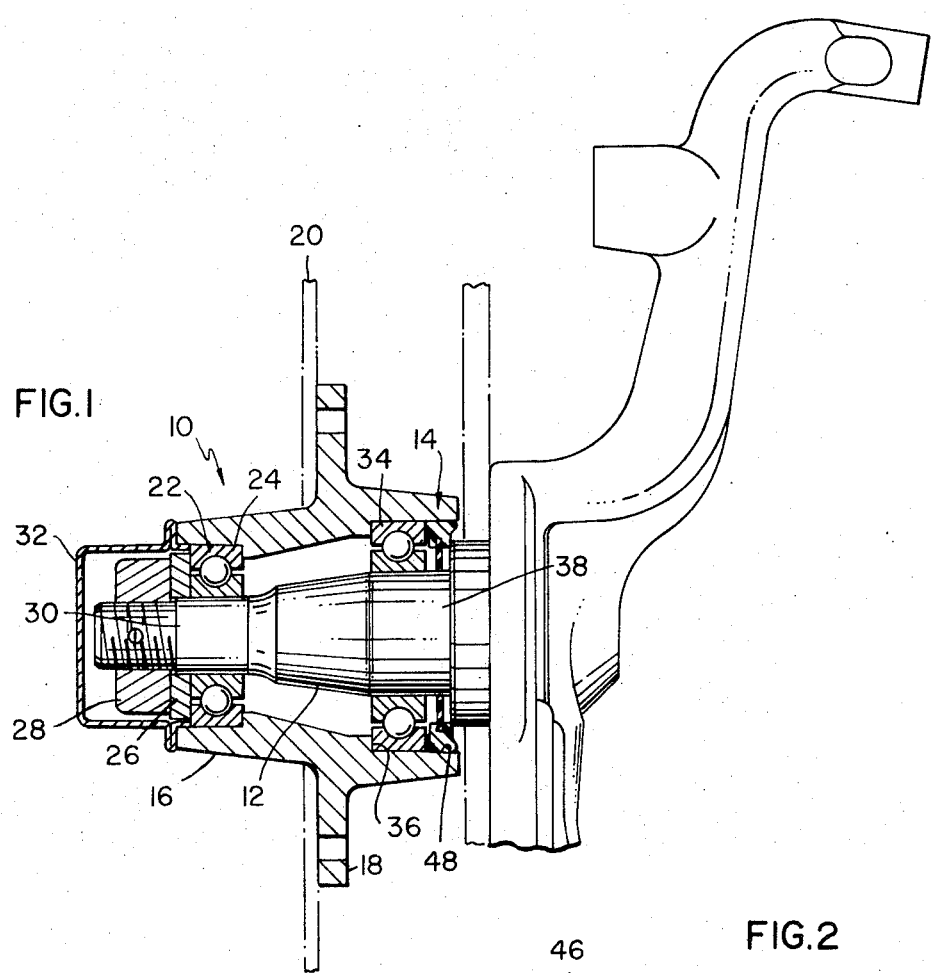
FIG. 1 is a view with parts in elevation and parts in section showing a wheel hub mounted on a front wheel spindle, with a seal assembly for the front wheel inner bearing secured within the hub, all in accordance with my invention.
Figure 3:
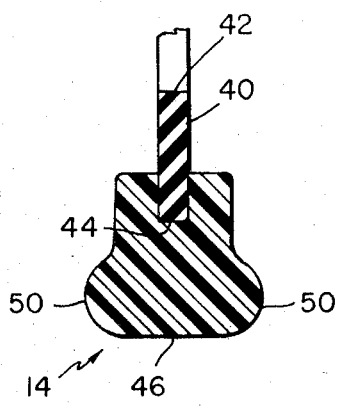
FIG. 3 is a fragmentary sectional view taken on the line 3—3 in FIG. 2.
Figure 2:
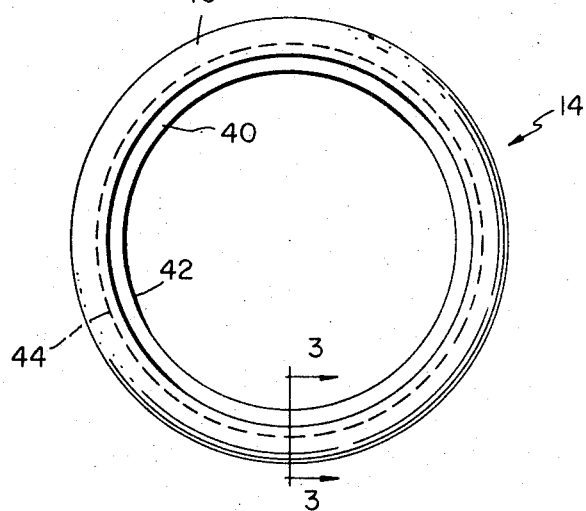
FIG. 2 is a side elevational view of the seal assembly.

Referring now more particularly to the invention, the reference numeral 10 designates a wheel hub, 12 designates a front wheel spindle and 14 designates a seal assembly for the inner bearing of the hub.

The hub 10 is of more or less conventional construction formed of cast iron, cast steel or a steel forging, and having a tubular portion 16 and an integral radially outwardly extending flange 18 on which the wheel 20 may be bolted. An outer bearing 22 is secured within the outer end of the tubular portion 16 of the hub against the internal shoulder 24 by a washer 26 and nut 28 threaded on the outer end of spindle 12. Bearing 22 supports the outer end portion of the hub on the portion 30 of the spindle. A dust cap 32 is applied over the outer end of the hub to keep impurities from entering the bearing 22.

An inner bearing 34 is secured within the inner end of the tubular portion 16 of the hub against shoulder 36 thereof and supports the inner end of the hub on the inner portion 38 of the spindle.

The seal assembly 14 protects the inner bearing 34 from dirt and impurities which might otherwise enter through the inner end of the hub, and serves to retain lubrication grease. The seal assembly 14 comprises a flat ring 40 of any suitable elastomeric material preferably rubber. The circular radially inner and outer edges of the ring 40 are respectively designated 42 and 44. The seal assembly also includes an annular rim or housing 46 of plastic material molded on the radially outer edge portion of the ring 40 so that the ring cannot turn relative to the housing. The rim or housing 46 is formed of a thermoplastic material, preferably nylon, and also preferably reinforced with glass or other fibers.

Best results have been achieved with 6/6 nylon with 30 percent by volume glass-fiber reinforcement uniformly dispersed. 6/6 nylon is a shortened chemical designation for polyhexamethylenedipamide, the chemical formula for which is: $[NH (CH_2)_6 NHCO (CH_2)_4 CO]_x$. Good results have also been obtained by using different percentages of glass-fiber reinforcement within the range of 10 to 40 percent.

The rim or housing 46 is preferably injection molded upon the outer edge portion of the ring 40. As seen in FIG. 1, the housing or rim 46 fits snugly within the cylindrical radially inner surface 48 at the inner end of the housing, preferably with an interference fit of 0.006 inches. An interference or press fit of this amount will insure that the seal assembly will not turn in the hub when the hub rotates on the spindle.

A housing 46 formed of 6/6 nylon with 30 percent by volume glass-fiber reinforcement uniformly dispersed has a coefficient of thermal expansion which is greater than that of the hub. Specifically, the temperature coefficient for this housing material has been found to be $T_c = 1.3 \times 10^{-5}$ in./in/°F. In other words, the housing will increase in circumference $1.3 \times 10^{-5}$ inch per inch of circumference per ° Fahrenheit. Cast iron and steel, of either of which the hub might be made, have temperature coefficients of $5.56 \times 10^{-6}$ and $6.36 \times 10^{-6}$ respectively. Increases in temperature of the hub and seal assembly during use will cause the interference fit between the housing and the hub to increase slightly. The interference fit should not increase too much because of the possibility of distortion of the plastic housing.

If the plastic housing in the bore of the hub is not tight enough it will turn in the bore in some extremely cold conditions which is undesirable, while too tight a fit will result in distortion of the housing. The heat deflection temperature of the housing formed of the preferred materials indicated above is 450°F. at 66 psi and 430°F. at 264 psi when tested per ASTM D 648. Using the preferred materials and the specified interference fit of 0.006 inches, the seal assembly has been found to operate satisfactorily under normal operating conditions of heat and cold without distortion and without turning in the bore of the hub at temperatures in the range from −40° F. to 275° F.

It is preferred that the outer lateral edges 50 of the housing 46 be arcuately convex as indicated to facilitate the installation of the seal assembly in the hub with an interference or press fit. Both edges 50 are shown rounded so that the seal cannot be installed backwards, although obviously only one such edge needs to be rounded for the purpose intended.

The inner margin or edge 42 of the ring 40 bears upon the spindle portion 48 throughout 360° to prevent dust and other impurities from entering the inner bearing 34 and to retain lubrication grease.

What I claim as my invention is:

1. A seal assembly for a front wheel inner bearing, said seal assembly comprising a flat ring of rubber, and an annular housing formed of glass-fiber reinforced nylon molded on the outer edge portion of said ring and adapted to fit tightly within the wheel hub at the inner end thereof, the inner edge of said ring being adapted to sealingly engage a wheel spindle on which the hub is mounted.

2. The seal assembly defined in claim 1, wherein said housing is formed of 6/6 nylon reinforced with approximately 30% by volume of glass fibers uniformly dispersed.

* * * * *